No. 613,251. Patented Nov. 1, 1898.
E. E. CROOK.
TEA OR COFFEE POT.
(Application filed May 31, 1898.)
(No Model.)
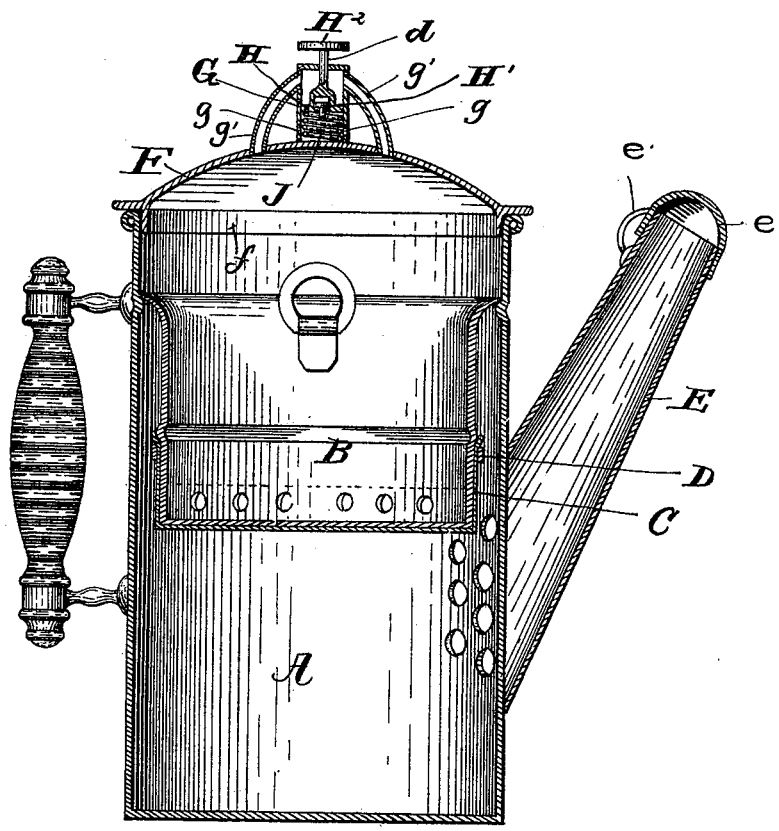
Witnesses,
Carl Schlegel
L. A. Minturn
Inventor
Edwin E. Crook,
By Joseph A. Minturn
Attorney.

UNITED STATES PATENT OFFICE.

EDWIN E. CROOK, OF INDIANAPOLIS, INDIANA.

TEA OR COFFEE POT.

SPECIFICATION forming part of Letters Patent No. 613,251, dated November 1, 1898.

Application filed May 31, 1898. Serial No. 682,149. (No model.)

*To all whom it may concern:*

Be it known that I, EDWIN E. CROOK, a citizen of the United States, residing at Indianapolis, in the county of Marion and State of Indiana, have invented certain new and useful Improvements in Tea or Coffee Pots, of which the following is a specification.

My invention relates to improvements in tea or coffee pots; and its object is to provide positive means for injecting cold air into the pot for the purpose of condensing the steam and vapor and preventing the escape of the aroma that may be therein and which would otherwise pass off and be lost.

I accomplish the objects of the invention by the mechanism illustrated in the accompanying drawing, which shows a vertical central section of my improved pot.

Similar letters of reference indicate like parts throughout the drawing.

A represents a tea or coffee pot of any desired shape or size, and B is the vessel in which the ground coffee or tea-leaves are placed. The bottom and sides of this vessel are perforated, as shown, and over the bottom and sides of this perforated part is placed a cloth C, which acts as a strainer and which cloth is held in position by means of the ring D. Where the vessel is used in a teapot, the straining-cloth will be much finer than in one which is used in a coffee-pot. The upper edge of the vessel B is turned outward to form a flange, and the side of the pot is correspondingly grooved or indented to form a resting-place for the flange.

E is the spout of the pot, and $e$ a cap whereby the spout can be closed to prevent the escape of the steam. A wire retaining-guide $e'$ prevents the displacement of the cap.

F is a cover or lid which is hinged to the top of the pot in the usual manner and has the usual depending flange $f$. Instead of the usual knob I employ on the top of the lid a vertical cylindrical body G, having the openings $g$ through the lower walls and having the tubular conduits $g'$ starting from near the top of the cylinder and emptying into the interior of the pot. The top end of the cylinder is closed with the exception of a small central opening, through which the rod $d$ of the piston or bucket H is projected. The bucket H is provided with the ordinary bucket-valve H', which rises as the bucket descends and closes as the bucket rises to discharge the air above into the pot through the tubes $g'$. A spring J on the under side of the bucket exerts an upward tendency on the latter, which makes it necessary only to press down on the button $H^2$ on the upper end of the rod $d$.

When the vapors in the form of steam indicate to the eye or the aroma indicates to the sense of smell that valuable qualities are discharging from the pot, a few downward pressures on the button $H^2$ will inject a sufficient amount of cold air into the pot to arrest volatilization.

Having thus fully described my invention, what I claim as new, and wish to secure by Letters Patent of the United States, is—

The combination, with a tea or coffee pot, of a cylinder secured to the top of the pot and connected through its lower portion with the atmosphere and at its upper portion, through tubular openings with the interior of the pot and a plunger or bucket working in the cylinder to force outside air into the pot.

In witness whereof I have hereunto set my hand and seal, at Indianapolis, Indiana, this 29th day of April, A. D. 1898.

EDWIN E. CROOK. [L. S.]

Witnesses:
JOSEPH A. MINTURN,
CARL SCHLEGEL.